United States Patent
Inada et al.

(10) Patent No.: US 11,726,370 B1
(45) Date of Patent: Aug. 15, 2023

(54) TRANSPARENT DISPLAY DEVICE

(71) Applicant: InnoLux Corporation, Miao-Li County (TW)

(72) Inventors: Toshiya Inada, Miao-Li County (TW); Masahiro Yoshiga, Miao-Li County (TW); Satoru Takahashi, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/865,329

(22) Filed: Jul. 14, 2022

(51) Int. Cl.
*G02F 1/1343* (2006.01)
*G02F 1/1339* (2006.01)

(52) U.S. Cl.
CPC .... *G02F 1/134336* (2013.01); *G02F 1/13439* (2013.01); *G02F 1/13394* (2013.01); *G02F 1/13396* (2021.01)

(58) Field of Classification Search
CPC ............ G02F 1/1333; G02F 1/133302; G02F 1/133305; G02F 1/1335; G02F 1/1339; G02F 1/13394; G02F 1/1343; G02F 1/134336; G02F 1/134345; G02F 1/13439
See application file for complete search history.

(56) References Cited

U.S. PATENT DOCUMENTS

| | | | |
|---|---|---|---|
| 2014/0267993 A1* | 9/2014 | Sugiyama | G02F 1/1337 349/128 |
| 2016/0026026 A1* | 1/2016 | Kim | G02F 1/1337 349/123 |
| 2018/0231837 A1 | 8/2018 | Fukuoka | |

FOREIGN PATENT DOCUMENTS

CN 107219697 A 9/2017

* cited by examiner

*Primary Examiner* — Thoi V Duong
(74) *Attorney, Agent, or Firm* — Winston Hsu (57) ABSTRACT

A transparent display device includes a display panel. The display panel has a plurality of pixel regions, the plurality of pixel regions comprising a first pixel region, the first pixel region comprising a first display region and a first transparent region. The display panel includes a first substrate, a second substrate, a display medium, and a transparent element. The second substrate is disposed opposite to the first substrate. The display medium is disposed between the first substrate and the second substrate and in the display region. The transparent element is disposed between the first substrate and the second substrate and in the transparent region. An area ratio of the transparent element based on the pixel region is in a range of 20% to 90%.

15 Claims, 8 Drawing Sheets

TRANSPARENT DISPLAY DEVICE

BACKGROUND OF THE DISCLOSURE

1. Field of the Disclosure

The invention relates to a transparent display device, and in particular, to a transparent display device with a transparent element disposed in the transparent region.

2. Description of the Prior Art

A transparent display device is a display device capable of displaying an image while allowing a user seeing through the display device. The transparent display device adopts transparent liquid crystals for display, and changes the level of alignments of the liquid crystals in response to electrical voltages applied thereto.

The highly aligned liquid crystals will pass most of the light through, increasing the level of transparency of the transparent display device. The less aligned (randomly arranged) liquid crystals will scatter most of the light, decreasing the level of transparency of the transparent display device. Nevertheless, the highly aligned display media will still scatter a small amount of the light, resulting in a less favorable hazy look (referred to as a hazy state) of the transparent display device.

Further, the transparent display device can be operated in a normally transparent mode or a normally diffuse mode. In the normally transparent mode, the liquid crystals are highly aligned and the display is in transparent mode when powered off, and the liquid crystals are tilted and the display is in diffuse state when powered on. In the normally diffuse mode, the liquid crystals are randomly arranged and the display is in diffuse mode when powered off, and the liquid crystals are highly aligned and the display is in transparent mode when powered on. For the normally diffuse mode, the power must remain turned-on for a high level of transparency, escalating issues of power consumption and heat dissipation.

SUMMARY OF THE DISCLOSURE

According to an embodiment of the invention, a transparent display device includes a display panel. The display panel has a plurality of pixel regions, the plurality of pixel regions comprising a first pixel region, the first pixel region comprising a first display region and a first transparent region. The display panel includes a first substrate, a second substrate, a display medium, and a transparent element.

The second substrate is disposed opposite to the first substrate. The display medium is disposed between the first substrate and the second substrate and in the display region. The transparent element is disposed between the first substrate and the second substrate and in the transparent region. An area ratio of the transparent element based on the pixel region is in a range of 20% to 90%.

These and other objectives of the present disclosure will no doubt become obvious to those of ordinary skill in the art after reading the following detailed description of the embodiment that is illustrated in the various figures and drawings.

DETAILED DESCRIPTION

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following description and claims, the terms "comprise", "include" and "have" are open-ended fashion, so they should be interpreted as "including but not limited to . . . ".

The ordinal numbers used in the specification and the appended claims, such as "first", "second", etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name. Thus, a first element mentioned in the specification may be called a second element.

Spatially relative terms, such as "above", "on", "beneath", "below", "under", "left", "right", "before", "front", "after", "behind" and the like, used in the following embodiments just refer to the directions in the drawings and are not intended to limit the present disclosure. It may be understood that the elements in the drawings may be disposed in any kind of formation known by those skilled in the related art to describe or illustrate the elements in a certain way.

Furthermore, when one element is mentioned to overlap another element, it may be understood that the element may partially or completely overlap the another element.

In addition, when one element or layer is "on" or "above" another element or layer, or is connected to another element or layer, it may be understood that the element or layer is directly on the another element or layer, or is directly connected to the another element or layer, and alternatively another element or layer may be between the one element or layer and the another element or layer (indirectly). On the contrary, when the element or layer is "directly on" the another element or layer or is "directly connected to" the another element or layer, there is no intervening element or layer between the element or layer and the another element or layer.

As disclosed herein, the terms "approximately", "about", and "substantially" generally mean within 10%, 5%, 3%, 2%, 1%, or 0.5% of the reported numerical value or range. The quantity disclosed herein is an approximate quantity, that is, without a specific description of "approximately", "about", "substantially", the quantity may still include the meaning of "approximately", "about", and "substantially".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

In the present disclosure, the length, thickness and width may be measured by using an optical microscope, an electron microscope, or other approaches, but not limited thereto.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiments of the present disclosure.

In the present disclosure, the electronic device may have a display function and may optionally include an optical sensing, image detecting, touching sensing, or antenna function, other suitable functions or any combination thereof, but not limited thereto. In some embodiments, the electronic device may include tiled device, but not limited thereto. The electronic device may include liquid crystal molecule, light-emitting diode (LED), quantum dots material, a fluorescent material, a phosphor material, other suitable materials, or any combination thereof, but not limited thereto. The LED may for example include organic light-emitting diode (OLED), micro light-emitting diode (micro-LED) or mini light-emitting diode (mini-LED), or quantum dot light-emitting diode (e.g., QLED or QDLED), but not limited thereto. In addition, the electronic device may be a color display device or a single color display device. The appearance of the electronic device may be rectangular, circular, polygonal, a shape with curved edges, curved or other suitable shapes, but not limited thereto. The electronic device may optionally have peripheral systems such as a driving system, a control system, a light source system, a shelf system, etc.

Figure 1:
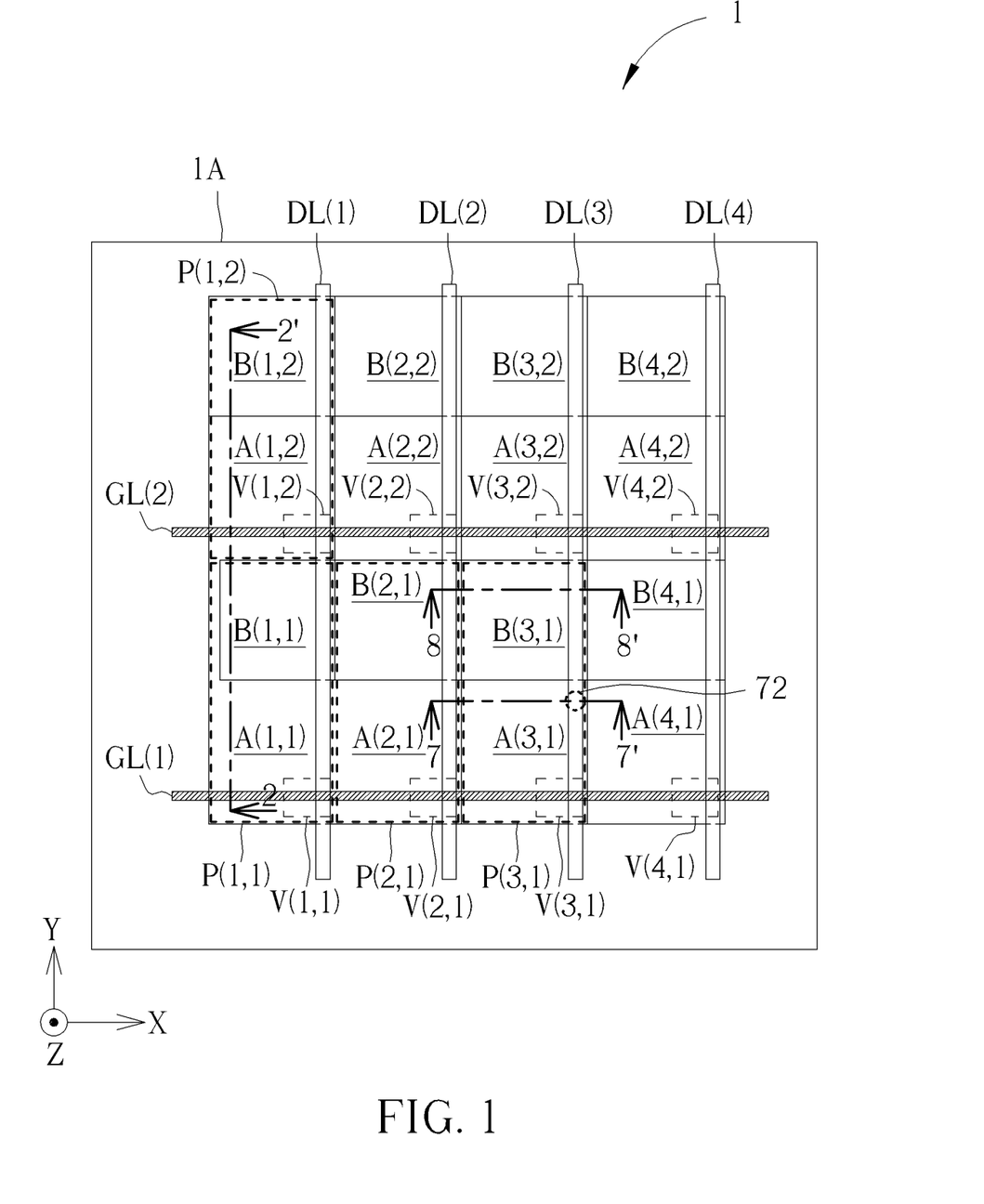
FIG. 1 is a layout diagram of a transparent display device according to an embodiment of the invention.

FIG. 1 is a layout diagram of a transparent display device 1 according to an embodiment of the invention. The transparent display device 1 may be operated in the normally transparent mode or the normally diffuse mode. Further, the transparent display device 1 may employ transparent display media for display, and employ transparent elements for providing transparency.

For simplicity, the operations of the transparent display device 1 will be explained in terms of the normally transparent mode in the subsequent paragraphs, and it should be readily apparent to one having ordinary skill that similar principles of the present invention can be applied to the transparent display device 1 in the normally diffuse mode.

Figure 2:
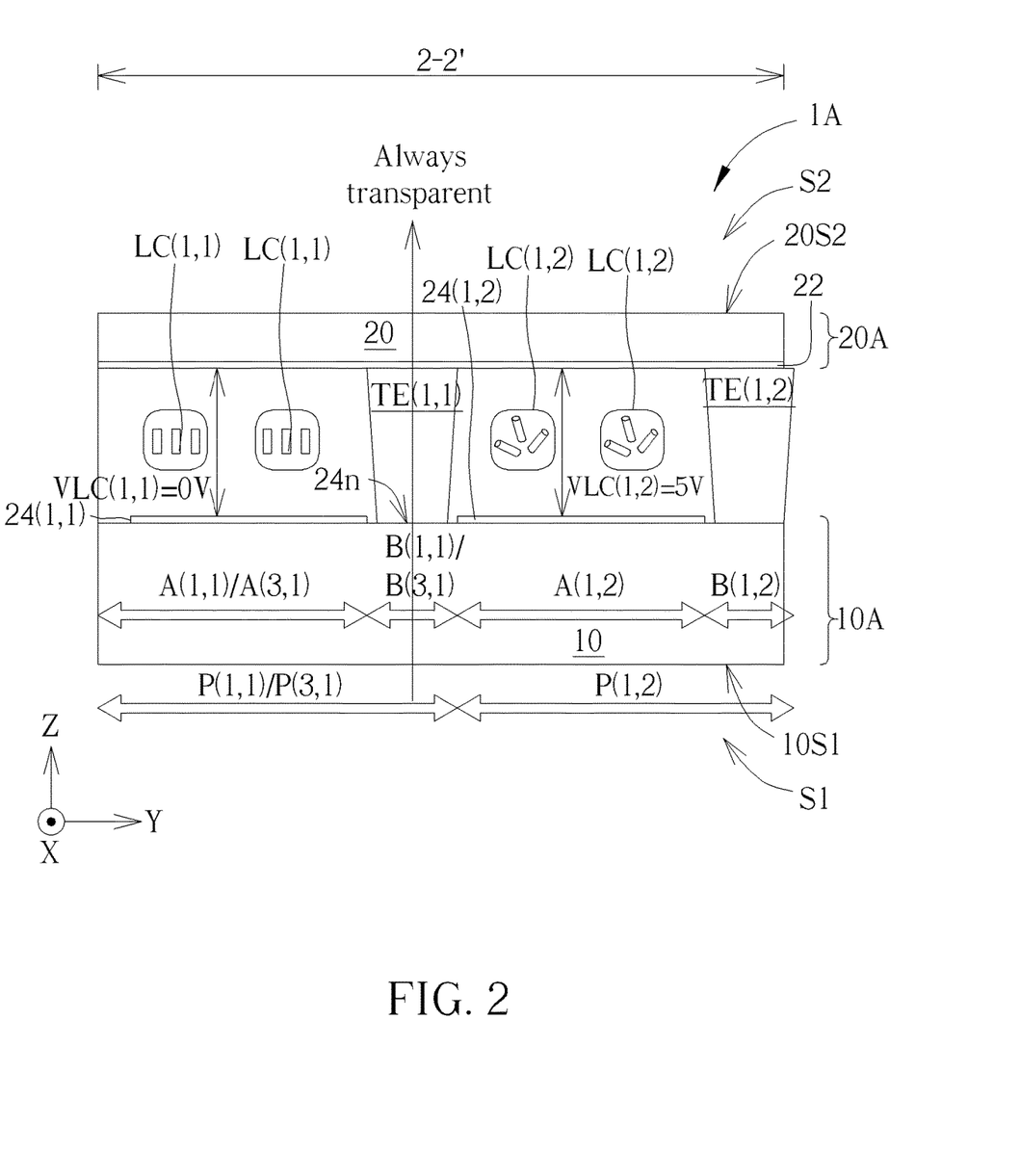
FIG. 2 shows a cross-sectional view of the transparent display device in FIG. 1 along line 2-2' according to an embodiment of the invention.

Referring to FIG. 1 and FIG. 2, the transparent display device 1 may include a display panel 1A, and the display panel 1A may include a first substrate 10A and a second substrate 20A disposed opposite to the first substrate 10A. The display panel 1A can include a plurality of pixel regions, and the plurality of pixel regions may include display regions A(1,1) to A(4,2) and transparent regions B(1,1) to B(4,2). For example, the first pixel region P(1,1) includes a first display region A(1,1) and a first transparent region B(1,1). The display panel 1A can further includes a first display medium LC(1,1) and a first transparent element TE(1,1). The first display medium part LC(1,1) can be disposed between the first substrate 10A and the second substrate 20A and in the first display region A(1,1). The first transparent element TE(1,1) can be disposed between the first substrate 10A and the second substrate 20A and in the first transparent region B(1,1). The display regions A(1,1) to A(4,2) and the transparent regions B(1,1) to B(4,2) may form the plurality of pixel regions. For example, a first display region A(1,1) and a first transparent region B(1,1) may form a first pixel region P(1,1), a second display region A(1,2) and a second transparent region B(1,2) may form a second pixel region P(1,2), and a third display region A(2,1) and a third transparent region B(2,1) may form a third pixel region P(2,1).

According to some embodiments, an area ratio of the first transparent element TE(1,1) based on the first pixel region P(1,1) is in a range of 20% to 90%, for example, in a range of 30% to 80%, in a range of 40% to 75%, in a range of 30% to 75%, in a range of 50% to 75%. According to some embodiments, the display medium may be disposed in the display regions A(1,1) to A(4,2), and the transparent elements may be disposed in the transparent regions B(1,1) to B(4,2). When the transparent display device is in a display mode, the display regions can display image, and the transparent regions can appear as transparent. In one pixel region (for example, the first pixel region), the area of the display region is an area with display image in a top view (for example, FIG. 1), and the area of the transparent region is an area where the transparent element is disposed in from the top view. When the transparent display device 1 is powered on, the area of the transparent region can be defined by all the transparent regions B(1,1) to B(4,2) in the top view. That is, the area of the transparent region is the area of the region where no image is displayed. In addition, the area of the transparent region can be measured by another way. In the top view of FIG. 1, the pixel region P(1,1) and the transparent region B(1,1) have the same length in the second direction X but different widths in the first direction Y. That is, the widths of the pixel region P(1,1) and the transparent region B(1,1) in the first direction Y can be used to measure the ratio of the area of the transparent region B(1,1) to the area of the pixel region P(1,1). Specifically, when the transparent display device 1 is powered off, in a cross-sectional view (e.g., FIG. 2), the width of the pixel region P(1,1) and the width of the transparent element TE(1,1) along the first direction Y can be measured. Thus, the area ratio of the transparent element TE(1,1) based on the pixel region P(1,1) can be obtained.

In some embodiments, the area ratio can be calculated based on a width. For example, referring to FIG. 2, the first transparent region B(1,1) may be defined by the maximum width of the first transparent element TE(1,1), e.g., the top width of the first transparent element TE(1,1) in FIG. 2. Further, the second transparent region B(1,2) may be defined by the maximum width of the second transparent element TE(1,2), e.g., the top width of the second transparent element TE(1,2) in FIG. 2.

When the transparent display device 1 is powered on, the display media in the display regions A(1,1) to A(4,2) may display pixels of an image, and the transparent elements in the transparent regions B(1,1) to B(4,2) may stay transparent. As a result, the larger the overall area of the transparent regions B(1,1) to B(4,2) is, the higher level of transparency of the transparent display device 1 will be.

Referring to FIG. 2, the first substrate 10A can include a first base substrate 10, and a pixel electrode layer 24 disposed on the first base substrate 10. The material of the first base substrate 10 may be glass, plastic or other transparent substrates. The display medium may be polymer network liquid crystals (PNLC) or polymer diffuse liquid crystals (PDLC) or any other transparent liquid crystals, and may be positive dielectric anisotropy liquid crystals (LC) or negative dielectric anisotropy LCs. According to some embodiments, the display medium can include cholesteric liquid crystal or guest-host liquid crystal with pigment. The pixel electrode layer 24 can include a plurality of pixel electrodes. For example, a pixel electrode 24(1,1) is disposed in the display region A(1,1) of the pixel region P(1,1) and a pixel electrode 24(1,2) is disposed in the display region A(1,2) of the pixel region P(1,2).

Figure 7:
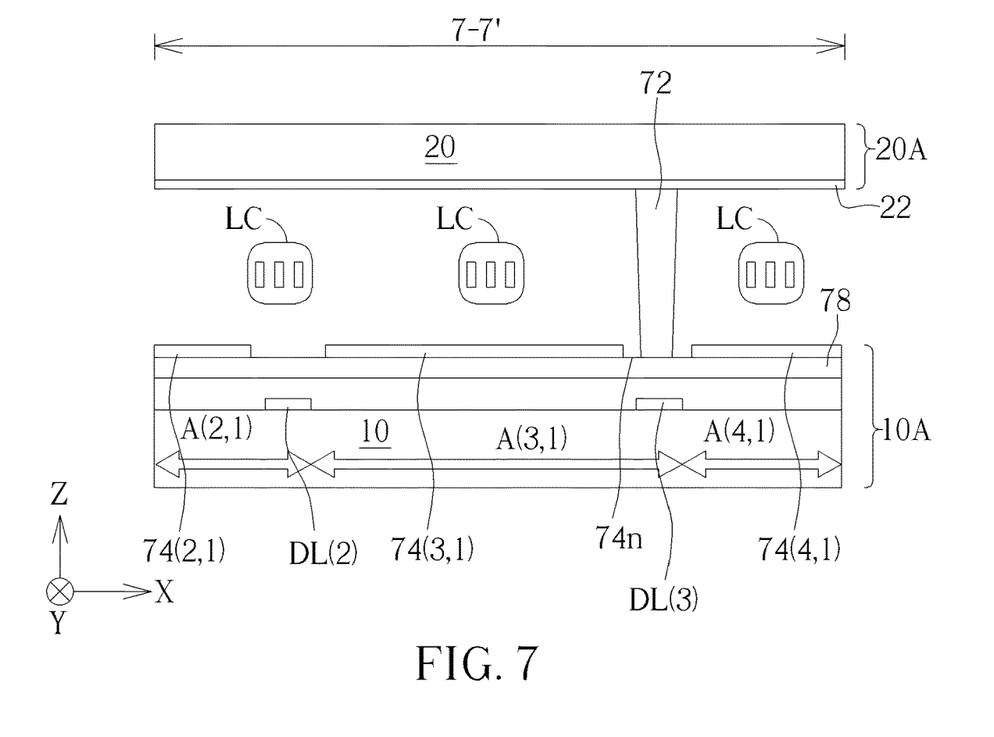
FIG. 7 shows a cross-sectional view of the transparent display device in FIG. 1 along line 7-7' according to an embodiment of the invention.

According to some embodiments, the transparent element can be organic material, inorganic material, or combinations thereof. For example, the transparent element can be photosensitive material. In some embodiments, the transparent element can be used as a spacer for maintaining the cell gap between the first substrate 10A and the second substrate 20A. In some embodiments, the transparent element can be of the same layer as a photo spacer, and can be formed in the same process as the photo spacer. Specifically, please refer to FIG. 1 and FIG. 7, in which FIG. 7 is a cross-sectional view taken along line 7-7' of FIG. 1. Referring to FIG. 1 and FIG. 7, the spacer 72 in the display region A(3,1) can be of the same layer as a transparent element in the transparent region. More detailed explanation will be described later in the FIG. 7 related portion.

Referring to FIG. 1, the transparent display device 1 may further include a plurality of data lines extending along a first direction Y, and a plurality of gate lines extending along a second direction X. The first direction Y and the second direction X can be different, and may be, for example, perpendicular to each other. For simplicity, FIG. 1 only shows four data lines DL(1) to DL(4), two gate line GL(1) and GL(2), and eight pixel regions. The first pixel region P(1,1) may be adjacent to the second pixel region P(1,2) along the first direction Y, and the first pixel region P(1,1) may be adjacent to the third pixel region P(2,1) along the second direction X. A pixel region being adjacent to another pixel region means that no other pixel region is located between these two pixel regions.

Referring to FIG. 1, according to some embodiments, a driving element can be electrically connected to the data lines DL(1) to DL(4) and gate line GL(1) and GL(2). Specifically, for example, a first driving element V(1,1) is disposed in the first display region A(1,1), and can be electrically connected to the corresponding data line DL1 and the gate line GL1. A second driving element V(1,2) is disposed in the second display region A(1,2), and can be electrically connected to the corresponding data line DL1 and the gate line GL2. In detail, the driving elements V(1,1) and V(1,2) can be driving transistors. According to some embodiments, in one pixel region, the transparent region includes a portion of the data line that is electrically connected to the pixel electrode in the pixel region. Specifically, in FIG. 1, in the pixel region P(1,1), the transparent region B(1,1) includes a portion of the data line DL1 that is electrically connected to the pixel electrode 24(1,1) (in FIG. 2) in pixel region P(1,1). According to some embodiments, the data lines (for example, DL1, DL2 . . . ) can be transparent, and may be, for example, indium tin oxide (ITO). According to some embodiments, the data lines can be non-transparent or opaque, and may be, for example, metal. According to some embodiments, the data lines can be transparent, and the transparent regions including portions of the data lines can be seen through. That is, a user can see the background environment of the transparent display device 1 through the transparent regions and portions of the data lines disposed in the transparent regions.

Referring to FIG. 1 and FIG. 2, the first pixel region P(1,1) is adjacent to the second pixel region P(1,2) along the first direction Y. The first direction Y can be an extending direction of a data line DL(1). The second pixel region P(1,2) includes a second display region A(1,2) and a second transparent region B(1,2). The transparent display device 1 can include a second transparent element TE(1,2) disposed between the first substrate 10A and the second substrate 20 A and in the second transparent region B(1,2). The first substrate 10 can include a second pixel electrode 24(1,2) disposed in the second display region A(1,2), and the first pixel electrode 24(1,1) and the second pixel electrode 24(1, 2) can be separated by an opening 24n. Specifically, the first pixel electrode 24(1,1) and the second pixel electrode 24(1, 2) can be adjacent and can be separated by the first transparent region B(1,1). The position of the opening 24n can be corresponding to the position of the first transparent region B(1,1), and the transparent element TE(1,1) can be disposed in the opening 24n.

The transparent display device 1 may adopt an active matrix scheme or a passive matrix scheme. While only 8 pixel regions, 2 gate lines and 4 data lines are shown in FIG. 1, it should be apparent to those skilled in the art other numbers of the pixel regions, gate lines and data lines may be adopted, and the pixel regions may be arranged into other shapes, in order to meet specific application requirements. According to some embodiments, the first pixel electrode 24(1,1) and/or the second pixel electrode 24(1,2) can be transparent or reflective. In some embodiments, the pixel electrode 24(1,1) and/or the second pixel electrode 24(1,2) can include a reflective material. In some embodiments, the pixel electrode 24(1,1) can be reflective. In some embodiments, the pixel electrode 24(1,1) can be transparent.

FIG. 2 shows a cross-sectional view of the transparent display device 1 along line 2-2' according to an embodiment of the invention. The transparent display device 1 may further include a second substrate 20A disposed opposite to the first substrate 10A. The second substrate 20A can include a second base substrate 20 and a common electrode 22 disposed on the second base substrate 20. The material of the second base substrate 20 may be glass, plastic or other transparent substrates. Display media LC(1,1) may be disposed in the first display region A(1,1) and between the first substrate 10A and the second substrate 20A, and display media LC(1,2) may be disposed in the second display region A(1,2) and between the first substrate 10A and the second substrate 20A. A first transparent element TE(1,1) may be disposed in the first transparent region B(1,1) and between the first substrate 10A and the second substrate 20A, and a second transparent element TE(1,2) may be disposed in the second transparent region B(1,2) and between the first substrate 10A and the second substrate 20A.

Referring to FIG. 2, the transparent display device 1 may further comprise a first pixel electrode 24(1,1), and a second pixel electrode 24(1,2). The first pixel electrode 24(1,1) may be disposed in the first display region A(1,1) on the first substrate 10, and the second pixel electrode 24(1,2) may be disposed in the second display region A(1,2) on the first substrate 10. The transparent display device 1 may further comprise a common electrode 22. The common electrode 22 may be disposed on the second substrate 20 and may extend above the first display region A(1,1), the first transparent region B(1,1), the second display region A(1,2), and the second transparent region B(1,2). The common electrode 22 may be arranged opposite to and separated from the first pixel electrode 24(1,1) and the second pixel electrode 24(1, 2).

In some embodiments, the second substrate 20A can include a color filter disposed in the display region, for example, disposed in the first display region A(1,1) to provide color, and can include another color filter disposed in the second display region A(1,2) to provide color.

In some embodiments, the common electrode 22 may be DC or AC voltage. Accordingly, the transparent display device 1 may be operated in the normally transparent mode, and a voltage VLC(1,1)=0V may be established between the common electrode 22 and the first pixel electrode 24(1,1) for leaving the display media LC(1,1) in an aligned form, all display media LC(1,1) being vertically aligned to each other. A voltage VLC(1,2)=5V may be established between the common electrode 22 and the second pixel electrode 24(1,2) to generate an electric field for tilted and diffuse state of the display media LC(1,2). While specific values for the voltages VLC(1,1) and VLC(1,2) are given in the embodiment, other values may be used for the voltages VLC(1,1) and VLC(1,2) to satisfy the application requirements. For example, the voltage VLC(1,1) may be set to 5V to tilt and make diffuse state of the display media LC(1,1), and the voltage VLC(1,2) may be set to 0V to align the display media LC(1,2). In another example, the transparent display device 1 may be operated in the normally diffuse mode, and the voltage VLC(1,1) may be set to 0V to randomizing the orientations of the display media LC(1,1), and the voltage VLC(1,2) may be set to 5V to align the display media LC(1,2).

In the embodiment, since no pixel electrode is present in the transparent regions B(1,1) and B(1,2), there is one less element to affect the passage of the light in the optical paths through the transparent regions B(1,1) and B(1,2), further increasing the level of transparency.

In some embodiments, the transparent display device 1 may be of a reflective type, the common electrode 22 may be transparent and may include Indium tin oxide (TIO), zinc oxide (ZnO), cadmium oxide (CdO), and/or other transparent conductors, and the first pixel electrode 24(1,1) and the second pixel electrode 24(1,2) may include a reflective material such as silver (Ag), a silver alloy, aluminum (Al), an aluminum alloy, and other highly reflective metals/metal alloys. When a light source is present in the front side S2 of the transparent display device 1, the light will pass through the respective color filters above the first display region A(1,1) and the first display region A(1,2), the second substrate 20, the common electrode 22, the display media LC(1,1) and LC(1,2) and be reflected by the surface of the first pixel electrode 24(1,1) and the second pixel electrode 24(1,2) to display the image. The light source from the front side S2 can be ambient light or transparent from light. On contrast, optical paths along the second substrate 20, the common electrode 22, the first transparent element TE(1,1) and the second transparent element TE(1,2), and the first substrate 10 may always remain transparent, and consequently, the light will pass directly through the transparent optical paths, thereby reducing light scattering in the transparent regions B(1,1) and B(1,2) without liquid crystals, thereby increasing the level of transparency. In addition, in the case of normally diffuse mode, since no power is required to make the first transparent element TE(1,1) and the second transparent element TE(1,2) appears transparent, the power consumption and heat dissipation can be reduced for constant transparency.

In other embodiments, the transparent display device 1 may be of a transmissive type, the common electrode 22, the first pixel electrode 24(1,1), and the second pixel electrode 24(1,2) may be transparent and may include Indium tin oxide (ITO), zinc oxide (ZnO), cadmium oxide (CdO), and/or other transparent conductors, and a light source may be present in the rear side S1 of the transparent display device 1. The light source from the rear side S1 can be ambient light or a back light (not shown). According to some embodiment, the back light can be transparent back light. As shown in FIG. 2, the rear side S1 can be on a side of a rear surface 1051 of the first substrate 10A, and the front side S2 can be on a side of a front surface 20S2 of the second substrate 20A. The rear surface 1051 of the first substrate 10A is a surface away from the second substrate 20A, and the front surface 20S2 of the second substrate 20A is a surface away from the first substrate 10A. The light may pass through the first substrate 10A, the first pixel electrode 24(1,1) and the second pixel electrode 24(1,2), the display media LC(1,1) and LC(1,2), the common electrode 22, the second substrate 20A, and the respective color filters (not shown) disposed in the first display region A(1,1) and the first display region A(1,2) to display an image. In addition, light may still pass directly through the first transparent element TE(1,1) in the transparent region B(1,1) and the second transparent element TE(1,2) in the transparent region B(1,2). According to some embodiments, no display medium LC is present in the transparent regions, light scattering resulted from the display medium can be reduced. According to some embodiments, the amount of display medium LC in the transparent regions is less than the amount of display medium in the display regions, light scattering resulted from the display medium can be reduced. Therefore, according to some embodiments, the level of transparency in both the normally transparent mode and the normally diffuse mode can be increased, and power consumption and heat dissipation in the normally diffuse mode can be reduced.

In some embodiments, the respective color filters in the first display region A(1,1) and the second display region A(1,2) may be disposed in the first substrate 10A, rather than the second substrate 20A. Since the color filters are respectively located in the first display region A(1,1) and the second display region A(1,2), the transparency in the transparent regions B(1,1) and B(1,2) will not be degraded by the respective color filters. In other embodiments, the color filters may be omitted from the transparent display device 1.

According to some embodiments, in the transparent display device 1, the transparent element TE(1,1) is disposed in the transparent region B(1,1), thus, the transparency can be enhanced regardless of being in the normally transparent mode or the normally diffuse mode. According to some embodiments, no pixel electrode is present in the transparent region B(1,1) and no voltage is required to be applied to the transparent region B(1,1), thus reducing power consumption and reducing heat dissipation.

Figure 3:
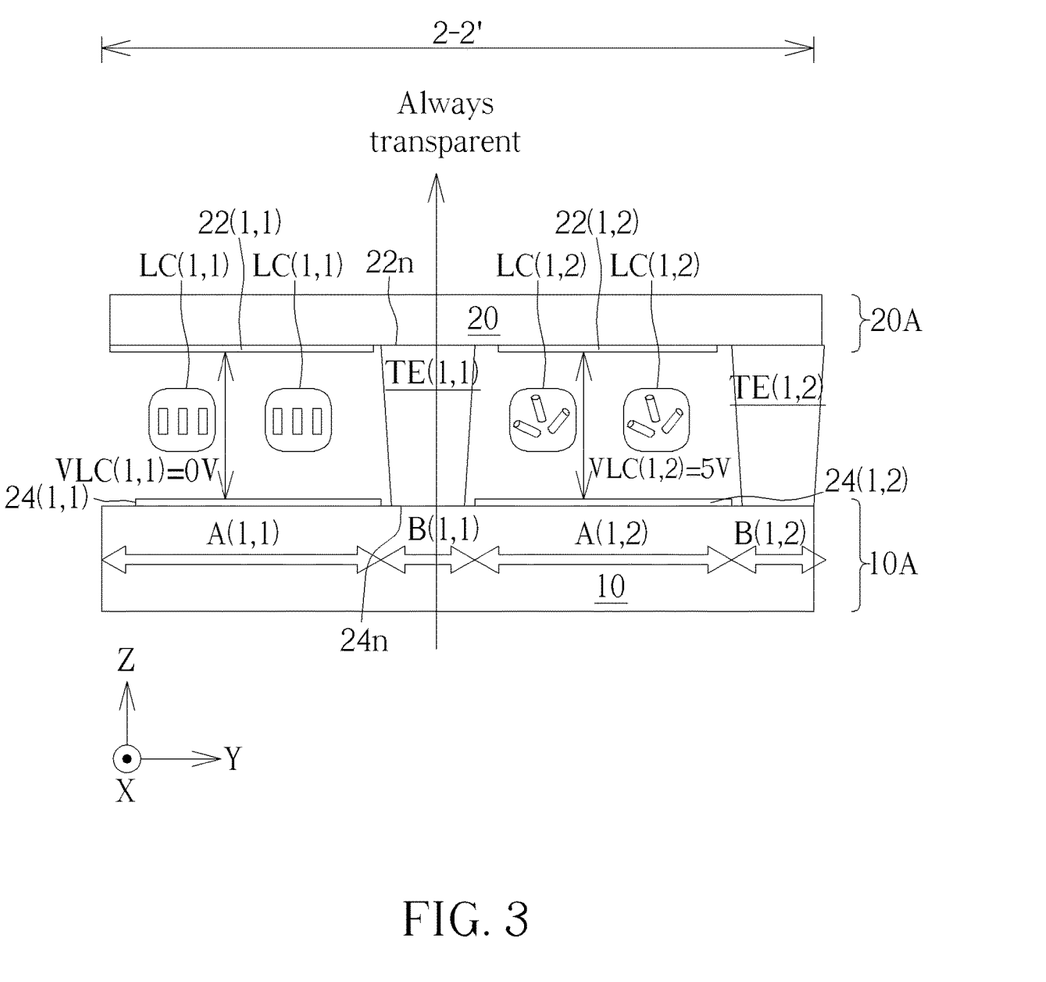
FIG. 3 shows a cross-sectional view of the transparent display device in FIG. 1 along line 2-2' according to another embodiment of the invention.

FIG. 3 shows a cross-sectional view of the transparent display device 1 along line 2-2' according to another embodiment of the invention. The structure in FIG. 3 may be replace that in FIG. 2, and the cross-sectional view in FIG. 3 is similar to FIG. 2, except that the common electrode 22 in FIG. 2 is replaced by patterned common electrodes 22(1,1) and 22(1,2) in FIG. 3. The patterned common electrodes 22(1,1) and 22(1,2) can be separated by an opening 22n disposed in the transparent region B(1,1). In the embodiment, referring to FIG. 3, since no common electrode is present in the transparent regions B(1,1) and B(1,2), there is one less element to affect the passage of the light in the optical paths through the transparent regions B(1,1) and B(1,2), further increasing the level of transparency.

Figure 4:
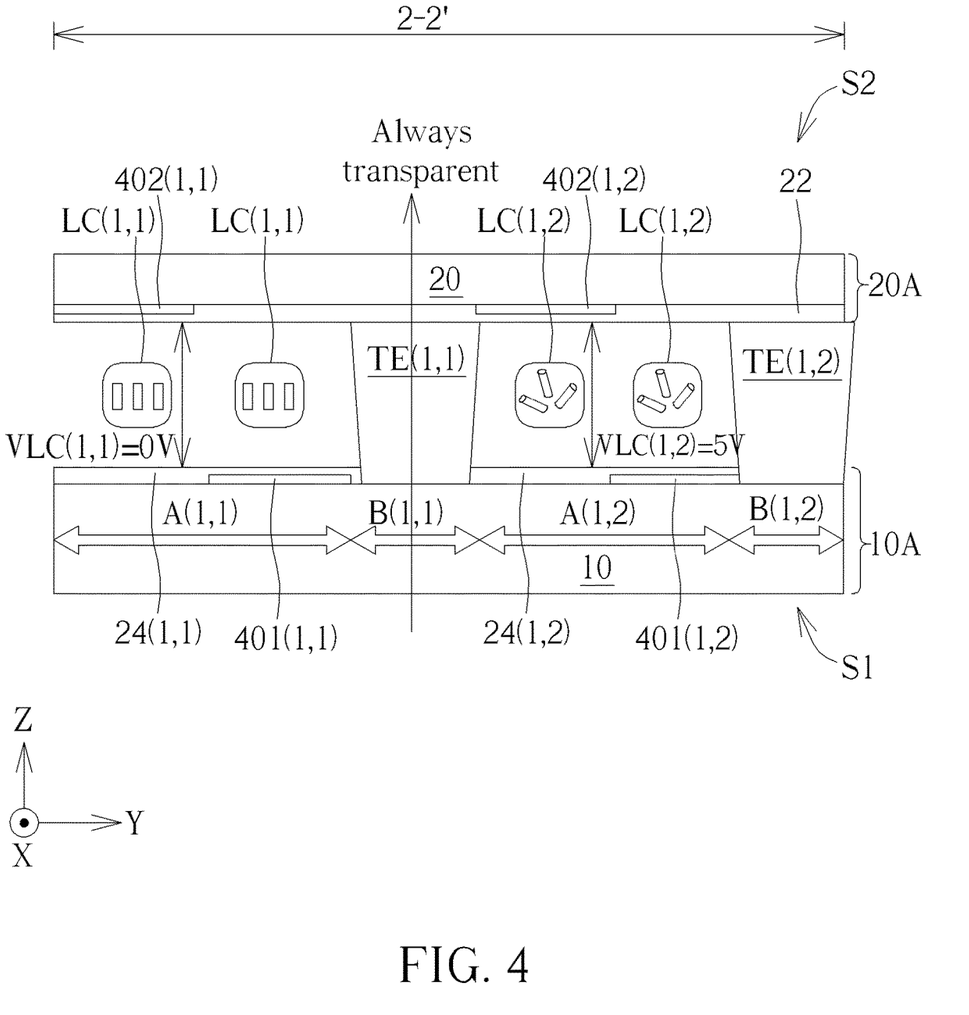
FIG. 4 shows a cross-sectional view of the transparent display device in FIG. 1 along line 2-2' according to another embodiment of the invention.

FIG. 4 shows a cross-sectional view of the transparent display device 1 taken along line 2-2' of FIG. 1 according to another embodiment of the invention. The structure in FIG. 4 is similar to FIG. 2, except that the transparent display device 1 may further include reflective materials 401(1,1), 402(1,1), 401(1,2) and 402(1,2) in FIG. 4. The following discussion will be addressed to the reflective materials 401(1,1), 402(1,1), 401(1,2) and 402(1,2), explanation for other components will be omitted for brevity.

Referring to FIG. 4, the first substrate 10A can include the reflective material 401(1,1) in the first display region A(1,1) and the reflective material 401(1,2) in the second display region A(1,2). The second substrate 20A can include the reflective material 402(1,1) in the first display region A(1,1) and the reflective material 402(1,2) in the second display region A(1,2). In the first display region A(1,1), the first substrate 10A includes the first reflective material 401(1,1), and the second substrate 20A includes the second reflective material 402(1,1). According to some embodiments, the first reflective material 401(1,1) and the second reflective material 402(1,1) can be not overlapped. That is, the first reflective material 401(1,1) and the second reflective material 402(1,1) are not overlapped along a thickness direction Z (third direction) of the first substrate 10A. The thickness direction Z can be different from the first direction Y and the second direction X. For example, the third direction Z can be perpendicular to the first direction Y and the second direction X. The first reflective material 401(1,1) and the second reflective material 402(1,1) are staggered along the first direction (Y). Thus, light can be reflected by the first reflective material 401(1,1) to the front side S2, and light can be reflected by the second reflective material 402(1,1) to the rear side S1. Likewise, according to some embodiments, in the second display region A(1,2), the reflective material 401(1,2) disposed in the first substrate 10A and the reflective material 402(1,2) disposed in the second substrate 20A can be non-overlapping. According to some embodiments, although not shown in figures, at least a portion of the first reflective material 401(1,1) and at least a portion of the second reflective material 402(1,1) can be not overlapped, and another portion of the first reflective material 401(1,1) and another portion of the second reflective material 402(1, 1) can be overlapped.

The reflective materials 401(1,1), 402(1,1), 401(1,2) and 402(1,2) may include a reflective material such as silver (Ag), a silver alloy, aluminum (Al), an aluminum alloy, and other highly reflective metals/metal alloys. The non-overlapping reflective materials 401(1,1) and 402(1,1) and the non-overlapping reflective materials 401(1,2) and 402(1,2) allow a reflective type of the transparent display device 1 to display an image to both the front side S2 and the rear side S1, while increasing the level of transparency. In some embodiments, the reflective materials 401(1,1) and 401(1,2) may be omitted from the transparent display device 1. In other embodiments, the reflective materials 402(1,1) and 402(1,2) may be omitted from the transparent display device 1.

Figure 5:
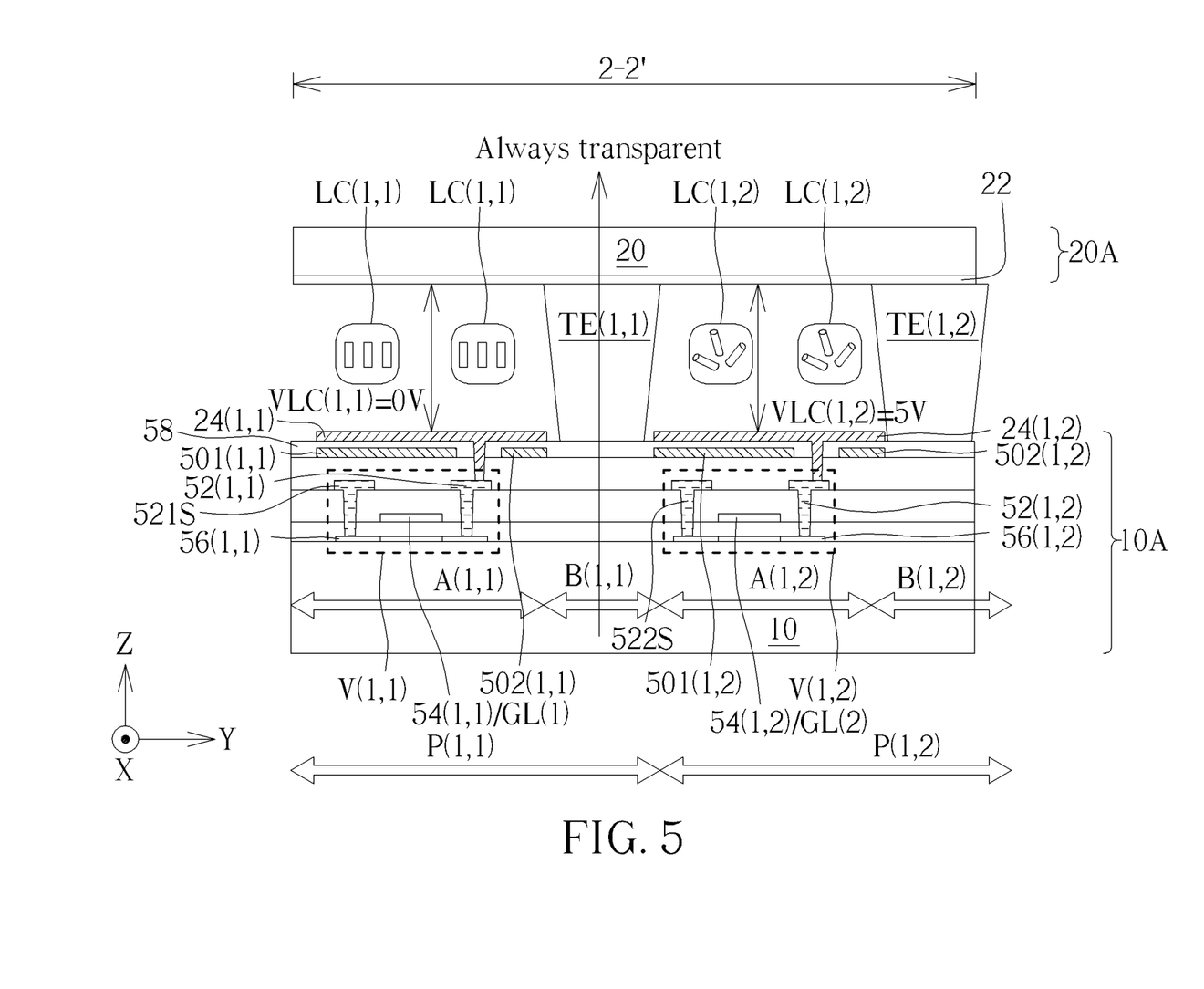
FIG. 5 shows a cross-sectional view of the transparent display device in FIG. 1 along line 2-2' according to another embodiment of the invention.

FIG. 5 shows a cross-sectional view showing two pixel regions P(1,1) and P(1,2) of the transparent display device 1 of FIG. 1 according to another embodiment of the invention. The structure in FIG. 5 is similar to FIG. 2, except that the transparent display device 1 may further include capacitor electrodes 501(1,1), 502(1,1), 501(1,2) and 502(1,2), the first driving element V(1,1) and the second driving element V(1,2) in FIG. 5. FIG. 5 shows a configuration for the active matrix scheme. For example, a first driving element V(1,1) is disposed in the first display region A(1,1), and a second driving element V(1,2) is disposed in the second display region A(1,2). In detail, the driving elements V(1,1) and V(1,2) can be driving transistors. The driving element V(1, 1) can be used for driving the display medium LC(1,1) in the first pixel region P(1,1), and the driving element V(1,2) can be used for driving the display medium LC(1,2) in the second pixel region P(1,2). The following discussion will be addressed to the capacitor electrodes 501(1,1), 502(1,1), 501(1,2) and 502(1,2) and driving transistors V(1,1) and V(1,2), explanation for other components will be omitted for brevity.

Referring to FIG. 5, an insulating layer 58 is disposed between the capacitor electrode and the pixel electrode, thus forming a capacitor. In details, in the display region A(1,1) of the first pixel region P(1,1), the insulating layer 58 is disposed between the capacitor electrode 501(1,1) and the first pixel electrode 24(1,1), thus forming a first capacitor. Similarly, in the display region A(1,2) of the second pixel region P(1,1), the insulating layer 58 is disposed between the capacitor electrode 501(1,2) and the second pixel electrode 24(1,2), thus forming a second capacitor. The capacitor electrodes 501(1,1), 502(1,1), 501(1,2) and 502(1,2) may be transparent or reflective. For example, the capacitor electrode can be transparent conductor such as Indium tin oxide (ITO), zinc oxide (ZnO), cadmium oxide (CdO), or mixtures thereof. In other embodiments, the capacitor can be a reflective metal such as silver (Ag), a silver alloy, aluminum (Al), an aluminum alloy, other highly reflective metals/metal alloys, or a mixtures thereof.

Referring to FIG. 5, the first driving element V(1,1) may include a drain electrode 52(1,1), a source electrode 521S, a gate electrode 54(1,1) and a semiconductor layer 56(1,1), and the second driving element V(1,2) may include a drain electrode 52(1,2), a source electrode 522S, a gate electrode 54(1,2) and a semiconductor layer 56(1,2). The gate electrode 54(1,1) may be electrically connected to the gate line GL(1), the source electrode 521S may be electrically connected to the data line DL(1), and the drain electrode 52(1,1) may be electrically connected to the first pixel electrode 24(1,1). Likewise, the gate electrode 54(1,2) may be electrically connected to the gate line GL(2), the source electrode 522S may be electrically connected to the data line DL(1), and the drain electrode 52(1,2) may be electrically connected to the second pixel electrode 24(1,2). The semiconductor layer can be amorphous silicon, low-temperature poly-silicon (LTPS) thin-film transistors (TFT), metal oxide, organic material, or mixtures thereof. An example of metal oxide can be indium gallium zinc oxide.

Figure 6:
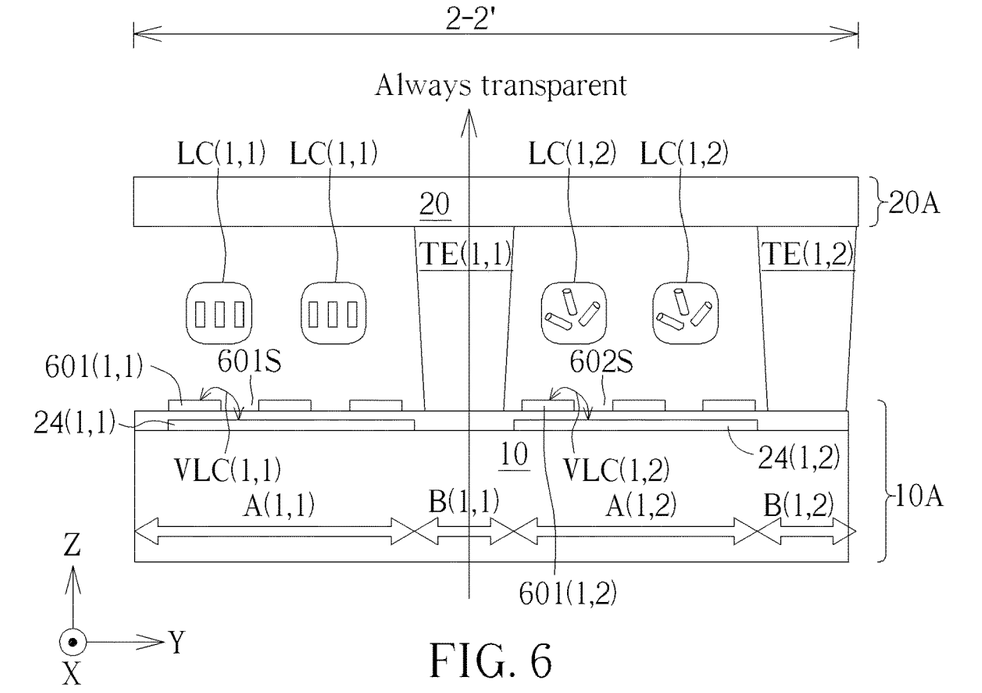
FIG. 6 shows a cross-sectional view of the transparent display device in FIG. 1 along line 2-2' according to another embodiment of the invention.

FIG. 6 shows a cross-sectional view of the transparent display device 1 along line 2-2' of FIG. 1 according to another embodiment of the invention. The structure in FIG. 6 is similar to FIG. 3, except that the common electrode 22(1,1) in FIG. 3 is replaced by a common electrode 601(1,1) with a slit 601S in FIG. 6, the common electrode 22(1,2) in FIG. 3 is replaced by a common electrode 601(1,2) with a slit 602S in FIG. 6. In FIG. 6, the common electrodes 601(1,1) and 601(1,2) are disposed on the first base substrate 10, that is, the first substrate 10A includes the common electrodes 601(1,1) and 601(1,2). The number of the slits in the common electrode is not limited, and can be one or more than one. For simplicity, in FIG. 6, two slits 601S are shown in the common electrode 601(1,1). According to some embodiments, in FIG. 6, the common electrode 601(1,1) can be disposed on the first pixel electrode 24(1,1). According to some embodiments, although not shown, the first pixel electrodes 24(1,1) can be disposed on the common electrode 601(1,1), and one or more slits can be present in the first pixel electrodes 24(1,1).

Referring to FIG. 6, the common electrode 601(1,1) and the first pixel electrode 24(1,1) are disposed on the first base substrate 10 and in the first display region A(1,1). The common electrode 601(1,2) and the second pixel electrode 24(1,2) are disposed on the first base substrate 10 and in the second display region A(1,2). A voltage VLC(1,1) can be between the common electrode 601(1,1) and the first pixel electrode 24(1,1), and a voltage VLC(1,2) can be applied between the common electrodes 601(1,2) and the second pixel electrode 24(1,2). For example, a voltage VLC(1,1) applied between the common electrode 601(1,1) and the first pixel electrode 24(1,1) may be set to 0V to keep the display medium LC(1,1) in the aligned form. A voltage VLC(1,2) between the common electrode 601(1,2) and the second pixel electrode 24(1,2) may be set to 5V to make the display medium LC(1,2) in a tilted form and in the diffuse state. Suitable materials used for the common electrodes 601(1,1), 601(1,2) and the pixel electrodes 24(1,1), 24(1,2) can refer to the above descriptions, and will be omitted for simplicity. In FIG. 6, the common electrode 601(1,1) is disposed on the pixel electrode 24(1,1). However, the positions of the pixel electrode and the common electrode are not limited. The function of common electrode 601(1,1), 601(1,2) and pixel electrode 24(1,1), 24(1,2) in FIG. 6 is able to exchange to operate LC(1,1), LC(1,2). That is, according to some embodiments, the pixel electrodes 601(1,1) and 601(1,2) can be disposed on the common electrode 24(1,1).

FIG. 7 shows a cross-sectional view of the transparent display device 1 taken along line 7-7' of FIG. 1 according to an embodiment of the invention. Line 7-7' cuts through the display regions A(2,1), A(3,1) and A(4,1). The transparent display device 1 may further includes a photo spacer 72 disposed in the display region A(3,1). The first substrate 10A includes pixel electrodes 74(2,1), 74(3,1) and 74(4,1), the second substrate 20A includes a common electrode 22. The data lines DL2 and DL3 are disposed on the first base substrate 10, an insulating layer 78 is disposed on the data lines DL2 and DL3, and the pixel electrodes 74(2,1), 74(3,1) and 74(4,1) are disposed on the insulating layer 78.

In addition, FIG. 2 can be a cross-sectional view showing the pixel region P(3,1) of FIG. 1. Taking the pixel region P(3,1) as the first pixel region, the first pixel region P(3,1) includes the first display region A(3,1) and the first transparent region B(3,1). As described above, the display medium LC is disposed between the first substrate 10A and the second substrate 20A and in the first display region A(3,1). The first transparent element TE(1,1) is disposed between the first substrate 10A and the second substrate 20A and in the first transparent region B(3,1). Referring to FIG. 7, in the embodiment, the spacer 72 (for example, photo spacer) may be disposed in the first display region A(3,1) for maintaining a cell gap between the substrates 10A and 20A. In some embodiments, the width of the spacer 72 can be increased along the second direction X, and for example, the spacer 72 can be disposed both in the display region A(3,1) and the display region A(4,1). The spacer 72 can disposed in the corresponding position of the data line DL3. That is, the spacer 72 can overlap with the data line DL3. Along the second direction X, the width of the spacer 72 can be less than, equal to, or greater than the width of the DL3. The spacer 72 can be in a position without the pixel electrode. In details, two adjacent pixel electrodes 74(3,1) and 74(4,1) are separated by an opening 74n, and the spacer 72 can be disposed in the opening 74n.

Referring to FIG. 7, in some embodiments, the transparent element can be of the same layer as a photo spacer, and can be formed in the same process as the photo spacer. Specifically, please refer to FIG. 1 and FIG. 7, in which FIG. 7 is a cross-sectional view taken along line 7-7' of FIG. 1. Taking the pixel region P(3,1) as the first pixel region, the first pixel region P(3,1) includes a first display region A(3,1) and a first transparent region B(3,1). The photo spacer 72 is disposed in the first display region A(3,1), and a first transparent element can be disposed in the first transparent region B(3,1). According to some embodiments, the spacer 72 disposed in the first display region A(3,1) and the first transparent element disposed in the first transparent region B(3,1) can be of the same layer, and can be formed in the same process.

Figure 8:
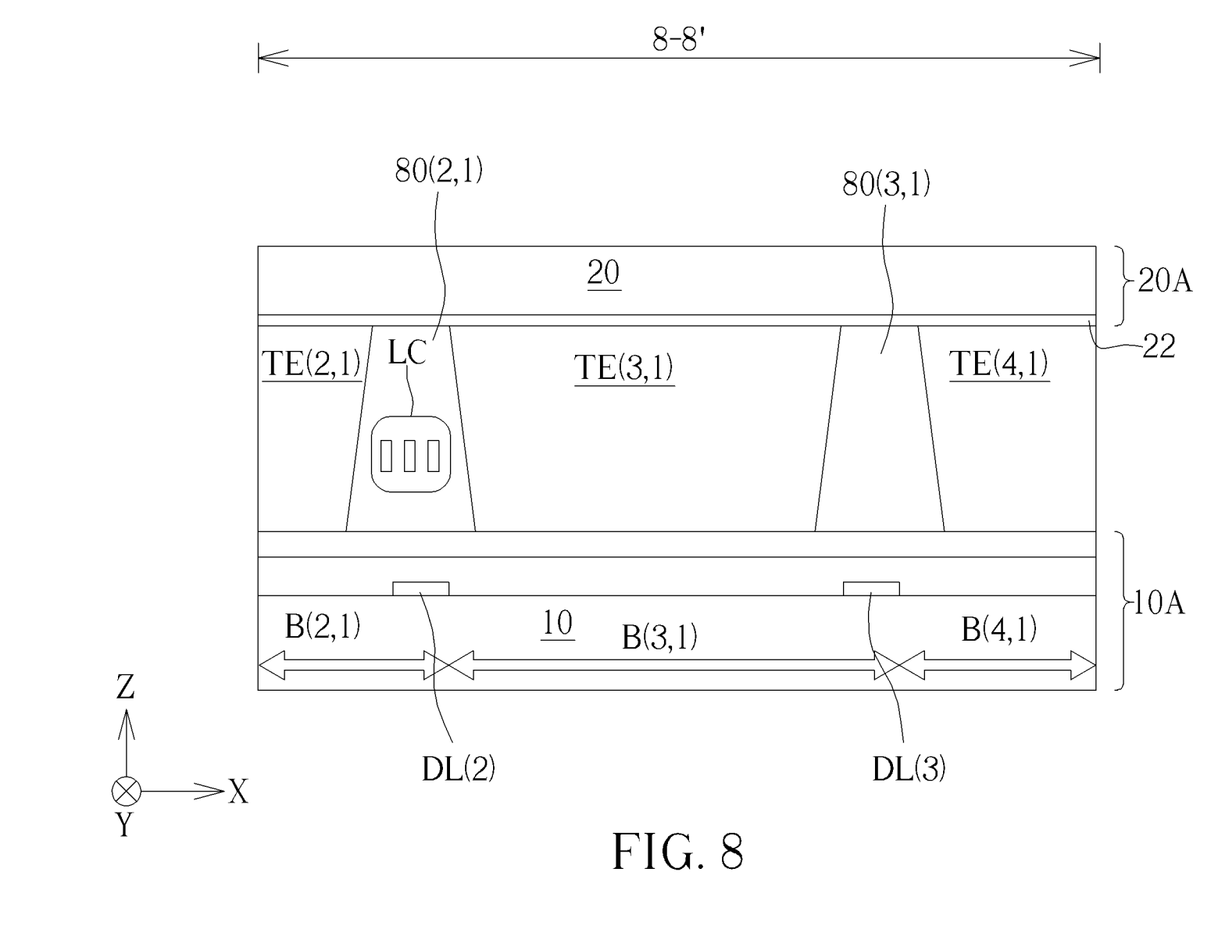
FIG. 8 shows a cross-sectional view of the transparent display device in FIG. 1 along line 8-8' according to an embodiment of the invention.

FIG. 8 shows a cross-sectional view of the transparent display device 1 along line 8-8' of FIG. 1 according to an embodiment of the invention. Line 8-8' cuts through the transparent regions B(2,1), B(3,1) and B(4,1). The transparent display device 1 may further include transparent elements TE(2,1), TE(3,1) and TE(4,1). The transparent element TE(2,1) may be disposed in the transparent region B(2,1) and between the first substrate 10A and the second substrate 20A, the transparent element TE(3,1) may be disposed in the transparent region B(3,1) and between the first substrate 10A and the second substrate 20A, and a transparent element TE(4,1) may be disposed in the transparent region B(4,1) and between the first substrate 10A and the second substrate 20A. The transparent elements TE(2,1), TE(3,1) and TE(4,1) may be equal in height. According some embodiments, the transparent elements TE(2,1), TE(3,1) and TE(4,1) may be different in height.

Referring to FIG. 8, a gap 80(2,1) may be formed between the transparent elements TE(2,1) and TE(3,1), and a gap 80(3,1) may be formed between the transparent elements TE(3,1) and TE(4,1). The display medium LC can be filled in the gaps 80(2,1) and 80(3,1). The position of a gap can be corresponding to the position of a data line. In details, the gap 80(2,1) can overlap with the data line DL2, and the gap 80(3,1) can overlap with the data line DL3.

Figure 9:
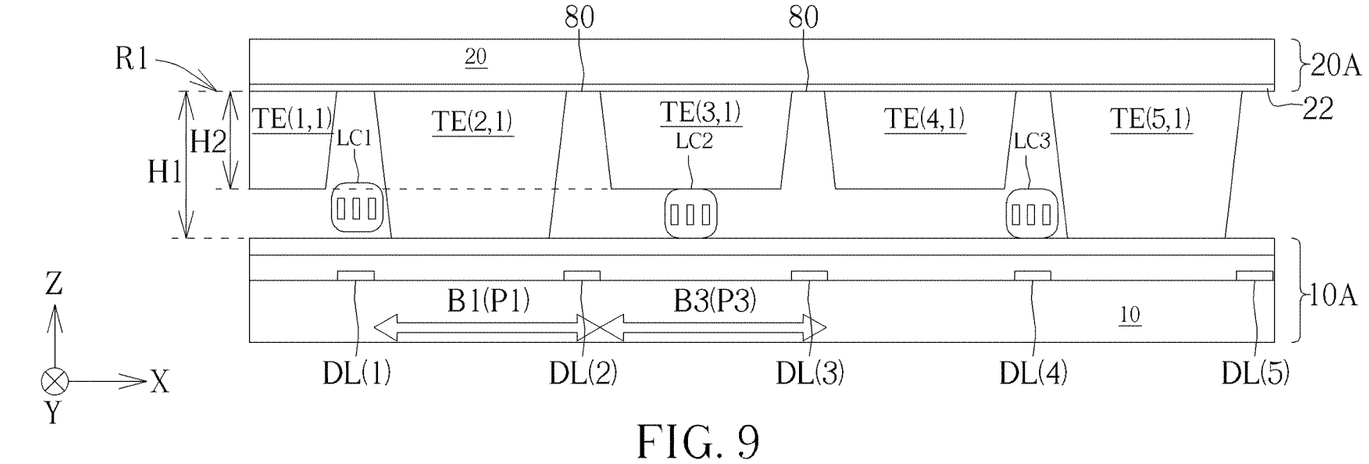
FIG. 9 shows a cross-sectional view of the transparent display device in FIG. 1 according to another embodiment of the invention.

FIG. 9 shows a cross-sectional view of cutting through 5 transparent elements in the transparent display device 1 according to another embodiment of the invention. The structure in FIG. 9 is similar to that in FIG. 8, except that the transparent elements TE(1,1) to TE(5,1) may vary in height. As described above, the transparent display device 1 includes a plurality of pixel regions, for example, a first pixel region P1, and a third pixel region P3. The first pixel region P1 and the third pixel region P3 are adjacent along the second direction X. The first pixel region P1 can include a display region and a first transparent region B1, and the third pixel region P3 can include a display region and a third transparent region B3. The second direction X can be the extending direction of a gate line. The display medium LC2 can be disposed between the third transparent element TE(3,1) and the first substrate 10A.

Referring to FIG. 9, the transparent display device includes a first transparent element TE(2,1) disposed between the first substrate 10A and the second substrate 20A and in the first transparent region B1. The first substrate 10A can include an insulating layer, a conductive layer, a pixel electrode, or other layers, but are omitted for simplicity. Also, the second substrate 20A can include an insulating layer, a conductive layer, a color filter layer, a black matrix layer, or other layers, but are omitted for simplicity. The transparent display device includes a third transparent element TE(3,1) disposed between the first substrate 10A and the second substrate 20A and in the third transparent region B3. The first transparent element TE(2,1) has a first height H1, the third transparent element TE(3,1) has a second height H2, and the first height H1 can be different from the second height H2 along a third direction Z. For example, the first height H1 is greater than the second height H2. The separation between the substrates 10A and 20A can be defined by the maximum height of the transparent elements TE(1,1) to TE(5,1). In the case where the transparent elements TE(1,1) to TE(5,1) are on the second substrate 20A, the first height H1 may be a distance (e.g., maximum distance) between a reference line R1 on the surface of the second substrates 20A and a bottom surface of the transparent element TE(2,1), and the second height H2 may be a distance (e.g., maximum distance) between the reference line R1 and a bottom surface of the transparent element TE(3,1).

Referring to FIG. 8, a gap 80 may be formed between the transparent elements TE(2,1) and TE(3,1). The display medium LC can be filled in the gap 80. The position the gap 80 can be corresponding to the position of the data line. In details, the gap 80 can overlap with the data line DL2. Similarly, another gap 80 can be formed between the transparent elements TE(3,1) and TE(4,1).

Figure 10:
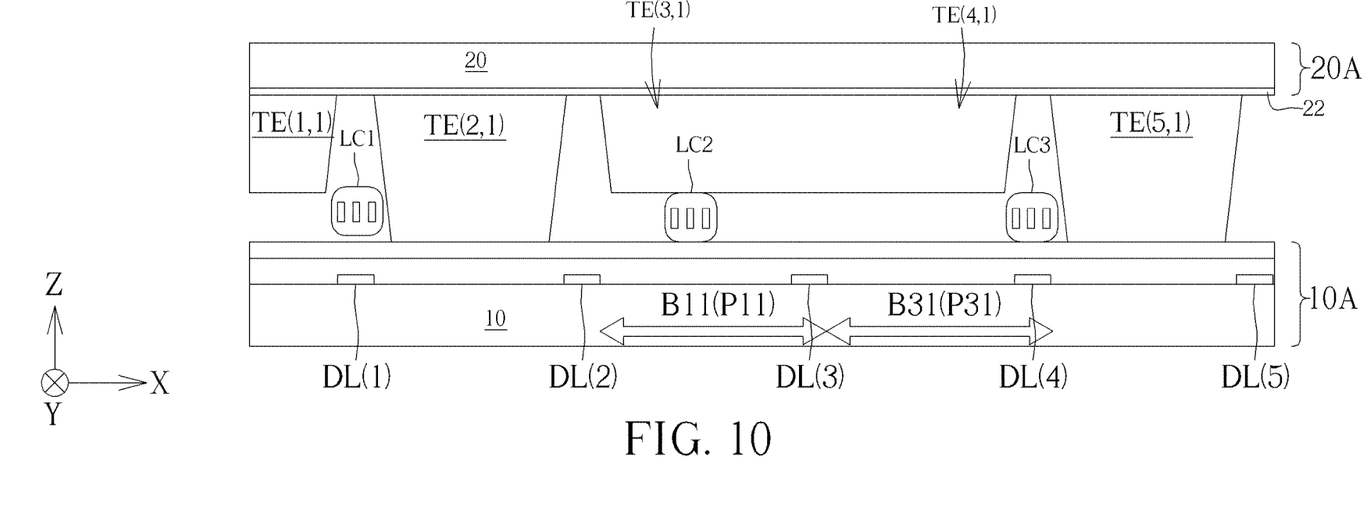
FIG. 10 shows a cross-sectional view of the transparent display device in FIG. 1 according to another embodiment of the invention.

FIG. 10 shows a cross-sectional view of cutting through 5 transparent elements in the transparent display device 1 according to another embodiment of the invention. The structure in FIG. 10 is similar to that in FIG. 8, except that transparent elements TE(1,1), TE(2,1), TE'(3,1) and TE(5,1) may vary in height and width. As described above, the transparent display device 1 includes a plurality of pixel regions, for example, a first pixel region P11 and a third pixel region P31. The first pixel region P11 and the third pixel region P31 are adjacent along the second direction (X). The first pixel region P11 can include a display region and a first transparent region B11, and the third pixel region P31 can include a display region and a third transparent region B31. The second direction (X) can be the extending direction of a gate line.

Referring to FIG. 10, no gap is present between the transparent elements in two adjacent transparent regions. In details, the first transparent element TE(3,1) is disposed between the first substrate 10A and the second substrate 20A and in the first display region B11. The third transparent element TE(4,1) is disposed between the first substrate 10A and the second substrate 20A and in the third display region B31. The first transparent element TE(3,1) and the third transparent element TE(4,1) are continuous. That is, in FIG. 10, there is no such gap 80 (in FIG. 9) between the first transparent element TE(3,1) and the third transparent element TE(4,1). The display medium (LC2) can be disposed between the first transparent element TE(3,1) and the first substrate 10A. According to some embodiments, the first transparent element TE(3,1) and the third transparent element TE(4,1) are continuous along the second direction X. According to some embodiments, the first transparent element TE(3,1) and a transparent element TE(2,1) adjacent to the transparent element TE(3,1) may have different heights. For example, the height of the transparent element TE(3,1) can be less than the height of the transparent element TE(2,1) along the third direction Z.

The embodiments in FIGS. 2 to 10 may be combined where appropriate to satisfy the application requirements. The technical features disclosed in the aforementioned embodiments can be replaced or recombined with one another to constitute another embodiment without departing from the spirit of the present disclosure.

In summary, according to some embodiments, in the transparent display device, the transparent element is disposed in the transparent region, thus, the transparency can be enhanced. According to some embodiments, no pixel electrode is present in the transparent region, and no voltage needs to be applied in the transparent region, thus reducing power consumption.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A transparent display device comprising:
 a display panel having a plurality of pixel regions, the plurality of pixel regions comprising a first pixel region, the first pixel region comprising a first display region and a first transparent region, wherein the display panel comprises:
  a first substrate;
  a second substrate disposed opposite to the first substrate;
  a display medium disposed between the first substrate and the second substrate and in the first display region; and
  a first transparent element disposed between the first substrate and the second substrate and in the first transparent region;
 wherein an area ratio of the first transparent element based on the first pixel region is in a range of 20% to 90%; and
 wherein the first substrate comprises a first reflective material disposed in the first display region, the second substrate comprises a second reflective material disposed in the first display region, and the first reflective material and the second reflective material are not overlapped.
2. The transparent display device of claim 1, wherein the area ratio of the first transparent element based on the first pixel region is in a range of 30% 25 to 75%.

3. The transparent display device of claim 1, wherein the first substrate comprises a first pixel electrode disposed in the first display region.

4. The transparent display device of claim 3, wherein:
the plurality of pixel regions further comprises a second pixel region adjacent to the first pixel region along a first direction;
the second pixel region comprises a second display region and a second transparent region; the transparent display device further comprises a second transparent element disposed between the first substrate and the second substrate and in the second transparent region;
the first substrate comprises a second pixel electrode disposed in the second display region; and
the first pixel electrode and the second pixel electrode are adjacent and separated by the first transparent region.

5. The transparent display device of claim 3, wherein the first pixel electrode is reflective.

6. The transparent display device of claim 1, wherein:
the plurality of pixel regions comprises a third pixel region adjacent to the first pixel region along a second direction;
the third pixel region comprises a third display region and a third transparent region; and
the transparent display device further comprises a third transparent element disposed between the first substrate and the second substrate and in the third transparent region, and the first transparent element and the third transparent element are continuous.

7. The transparent display device of claim 1, further comprising a spacer disposed in the first display region, wherein the spacer and the first transparent element are of the same layer.

8. A transparent display device comprising:
a display panel having a plurality of pixel regions, the plurality of pixel regions comprising a first pixel region, the first pixel region comprising a first display region and a first transparent region, wherein the display panel comprises:
a first substrate;
a second substrate disposed opposite to the first substrate;
a display medium disposed between the first substrate and the second substrate and in the first display region; and
a first transparent element disposed between the first substrate and the second substrate and in the first transparent region;
wherein an area ratio of the first transparent element based on the first pixel region is in a range of 20% to 90%;
the plurality of pixel regions further comprises a third pixel region adjacent to the first pixel region along a second direction;
the third pixel region comprises a third display region and a third transparent region; and
the transparent display device further comprises a third transparent element disposed between the first substrate and the second substrate and in the third transparent region, wherein the first transparent element has a first height the third transparent element has a second height, and the first height is greater than the second height.

9. The transparent display device of claim 8, wherein the display panel further comprises another display medium, and the another display medium is disposed between the third transparent element and the first substrate.

10. The transparent display device of claim 8, wherein the area ratio of the first transparent element based on the first pixel region is in a range of 30% to 75%.

11. The transparent display device of claim 10, wherein the first substrate comprises a first pixel electrode disposed in the first display region.

12. The transparent display device of claim 11, wherein:
the plurality of pixel regions further comprises a second pixel region adjacent to
the first pixel region along a first direction;
the second pixel region comprises a second display region and a second transparent region; the transparent display device further comprises a second transparent element disposed between the first substrate and the second substrate and in the second transparent region;
the first substrate comprises a second pixel electrode disposed in the second display region; and
the first pixel electrode and the second pixel electrode are adjacent and separated by the first transparent region.

13. The transparent display device of claim 11, wherein the first pixel electrode is reflective.

14. The transparent display device of claim 10, wherein the first substrate comprises a first reflective material disposed in the first display region, the second substrate comprises a second reflective material disposed in the first display region, and the first reflective material and the second reflective material are not overlapped.

15. The transparent display device of claim 10, further comprising a spacer disposed in the first display region, wherein the spacer and the first transparent element are of the same layer.

\* \* \* \* \*